W. & G. H. SELLERS.
Cooling Circulation about Rotating Puddling-Vessels.
No. 222,314.   Patented Dec. 2, 1879.
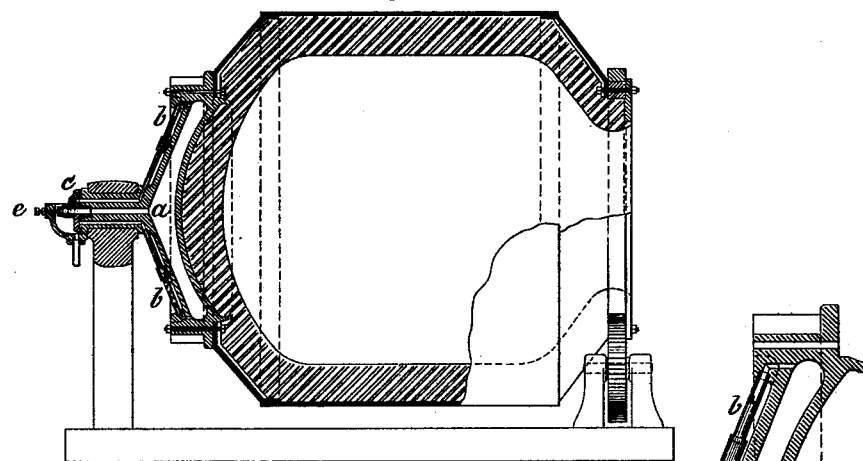
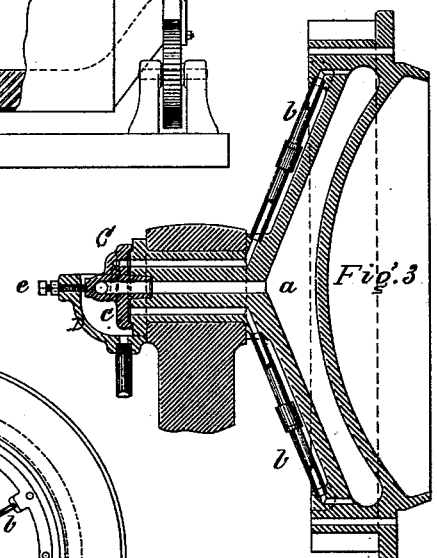
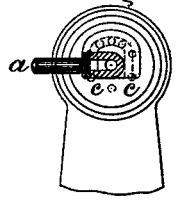
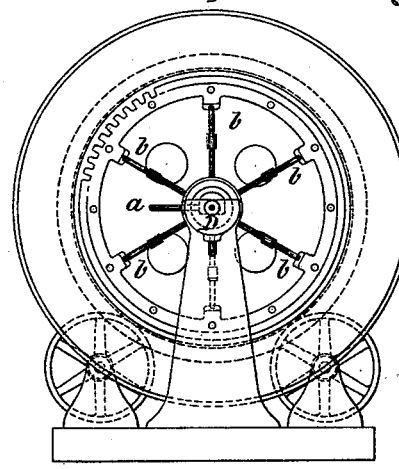
Witnesses:
Coleman Sellers
H. A. Fulton
Inventors
Wm Sellers
Geo. H. Sellers

UNITED STATES PATENT OFFICE.

WILLIAM SELLERS, OF PHILADELPHIA, PENNSYLVANIA, AND GEORGE H. SELLERS, OF WILMINGTON, DELAWARE; SAID GEORGE H. SELLERS ASSIGNOR TO JOHN SELLERS, JR., OF PHILADELPHIA, PENNSYLVANIA.

IMPROVEMENT IN COOLING CIRCULATION ABOUT ROTATING PUDDLING-VESSELS.

Specification forming part of Letters Patent No. 222,314, dated December 2, 1879; application filed March 17, 1876.

*To all whom it may concern:*

Be it known that we, WILLIAM SELLERS, of the city and county of Philadelphia, in the State of Pennsylvania, and GEORGE H. SELLERS, of the city of Wilmington, in the State of Delaware, have jointly invented certain Improvements in the Cooling Circulation about Rotating Puddling-Vessels, of which improvements the following is a specification.

Our invention relates more especially to that class of rotating puddling-vessels in which the axis of the puddling-vessel is substantially horizontal and the vessel itself is open at one end only; but it is also applicable to all puddling-vessels rotating about an axis inclined to the perpendicular, all such vessels being provided with a water-space about the axis of rotation and a water-supply thereto; and it is the object of our invention to discharge the water which effects the cooling near the axis of the vessel, to maintain the water-level at the highest point within the vessel, and to provide means for discharging the air which would be trapped within the vessel whenever the water may rise above the plane of its admission.

In such rotating puddling-vessels, when the axis of rotation is perpendicular, this cooling circulation is easily applied to the entire height or depth of the water-space by the simple device of an outlet-pipe, the entrance to which is at the highest point of the water-space; but when such a vessel is inclined on its axis, or where the axis of rotation of the vessel is substantially horizontal, the conditions which obtain are so essentially different that the means which are fully adequate with its rotation about a perpendicular axis are entirely inefficient, inasmuch as the water cannot rise within the vessel above the lowest plane which the entrance of the outlet-conduit will cut in its revolution with the vessel, and the water therefore fails to reach and protect the upper portion of the vessel when at rest—as, for example, while the charge is melting; and even while revolving under these conditions, the upper portion of the vessel would be unprotected during a greater or less portion of each revolution, according to the greater or less degree of the inclination of its axis of rotation, as is exemplified in the English Patent No. 2,237 of 1864. When, therefore, the axis is inclined from the perpendicular, it becomes necessary to provide a means for maintaining the water at the highest point in the water-space of the rotating vessel, and to attain this without trapping the air which the water will give off as it becomes heated. In all rotating puddling-vessels heretofore constructed, in which the axis is inclined from the perpendicular, or even substantially horizontal, it has been proposed to elevate the discharging end of the outlet-pipe above the rotating vessel; but such provision must necessarily trap the air within the vessel, and this air will prevent the water from filling the water-space.

To maintain the greatest height of water within the water-space without trapping the air, our invention consists in combining, in a rotating puddling-vessel having a water-space and a water-supply, an outlet-conduit, which revolves with the vessel, and a stationary valve, the entrance to the conduit from the water-space defining the distance from the axis of rotation at which the water can escape, while the valve defines the portion of the revolution within which it can escape, and limits the escape to that part of the revolution in which the entrance to the conduit is at the highest point in the water-space, at which point the air will collect and also be free to escape through the conduit, which, and the operation of which, will be clearly understood by reference to the accompanying drawings, which form part of this specification.

Figure 1 represents a longitudinal elevation, in section, of a puddling-vessel with a water-back constructed as described in Letters Patent granted to us November 11, 1873, but with a modified water-circulation, and showing, in section, the conduit for the admission of water, and, in view, outlet-conduits for the discharge of the same. Fig. 2 is an end elevation of the same, showing the conduit for admission of water and the outlet-conduits for its discharge. Fig. 3 is an enlarged elevation, in section, of the water-back shown in Fig. 1, and showing, in section, the conduit for the admission of water and outlet-conduits, partly in section and partly in view, for its discharge, and, in section, the valve which alternately opens and closes the outlet-conduits. Fig. 4 is an end elevation of this valve and its attachments, with the conduit for admission, partly in section.

The puddling-vessel and its water-back having been very fully described in our patent before referred to, it is unnecessary, for the purposes of this description, to make further reference thereto.

The conduit $a$, for the admission of water, is formed in the axis of the journal which supports the rear end of the puddling-vessel. It is surrounded by six outlet-conduits, $b\,b$, for discharging the water, which are formed in the same journal, and prolonged, by means of pipes, so as to communicate at their inner ends with the interior of the water-back at its largest diameter. The outer ends of these outlet-conduits are alternately opened and closed as they revolve with the vessel by the stationary valve C. This valve is provided with a circular projection, which fits into a corresponding recess in the rear end of the journal through which the water enters the supply-conduit leading to the water-back. This projection may be packed by any of the various means in use, so as to prevent the escape of water around it. In the face of this valve a series of holes are provided above the axis and concentric with the supply-conduit $a$, and of a size corresponding to that of the outlet-conduits $b$, but only extending around the axis sufficiently to permit two of the conduits $b$ to communicate with them at the same time. (See Fig. 4.) These holes communicate with a discharge-opening formed within the valve C, and having its outlets at $c\,c$, Figs. 3 and 4. The holes may be as described, or one elongated hole would answer the same purpose.

At the rear of the journal a hemispherical dish, D, is provided and securely fastened to the frame which supports the journal. A pipe, $d$, is attached to this dish, through which the water is discharged, which falls into the dish from the outlets $c\,c$, before mentioned.

In line with the axis of the vessel, and supported by the dish D, we provide a set-screw and jam-nut, $e$, for the purpose of pressing the valve C against the end of the journal, so as to prevent the escape of water through the outlet-conduits $b\,b$ until the revolution of the vessel shall bring them opposite the holes in the face of the valves before described.

The operation of the circulation apparatus is as follows: Water being admitted through the supply-conduit $a$ will flow into the water-back, while the air which it displaces will escape by the outlet-pipes $b\,b$, the outlet for one of which nearest the top will always be uncovered by the valve C. This will continue until the water-back is full of water, and if the supply is continued a continuous flow will be maintained through the openings $c\,c$ into the dish D, and by regulating the quantity of the supply the temperature may be maintained at any desired point. Neither the supply nor the discharge will be affected by the revolutions of the puddling-vessel, and any accumulation of air or steam will be prevented, as such accumulation must always take place at the top of the water-back, from which point there is always a free egress through one of the pipes $b$.

Having thus described the objects and nature of our invention, what we claim as new, and desire to secure by Letters Patent, is—

In a rotating puddling-vessel having a water-space about its axis of rotation, and a water-supply thereto, the combination of an outlet-conduit which revolves with the vessel, and a stationary valve, the entrance to the conduit defining the distance from the axis of rotation at which the water can escape, while the valve defines the portion of the revolution within which it can escape, and limits the escape to that part of the revolution in which the entrance to the conduit is at or about the highest point in the water-space, substantially as described.

WM. SELLERS.
GEO. H. SELLERS.

Witnesses:
CHAS. E. PANCOAST,
H. A. FULTON.